United States Patent [19]
Beaty, Jr. et al.

[11] 3,730,357
[45] May 1, 1973

[54] AUTOMATIC STACKING APPARATUS

[76] Inventors: Thomas Beaty, Jr., 20180 Whipple Drive, NOrthville, Mich. 48167; Asib S. Samander, 25802 Jeanette, Roseville, Mich. 48066

[22] Filed: May 12, 1971

[21] Appl. No.: 142,545

Related U.S. Application Data

[63] Continuation-in-part of Ser. No. 101,529, Dec. 28, 1970.

[52] U.S. Cl. .......................... 214/6 DK, 214/6 P
[51] Int. Cl. ............................................ B65g 57/06
[58] Field of Search ................ 214/6 P, 6 G, 6 PK, 214/6 S, 6 D, 6 DS

[56] References Cited

UNITED STATES PATENTS

| | | | |
|---|---|---|---|
| 3,064,827 | 11/1962 | Bostock, Jr. et al. | 214/6 DK |
| 3,430,784 | 3/1969 | Hall | 214/6 DK |
| 3,288,312 | 11/1966 | Hughes et al. | 214/6 D X |
| 3,416,674 | 12/1968 | Gualandris et al. | 214/6 DK |
| 3,410,421 | 11/1968 | Groll | 214/6 P |
| 3,520,396 | 7/1970 | Lingg | 214/6 DK UX |
| 3,612,300 | 10/1971 | Berghgracht | 214/6 DK |
| 3,381,828 | 5/1968 | Sheehan | 214/6 P |
| 3,256,011 | 6/1966 | Buccicone | 214/6 S |
| 2,930,493 | 3/1960 | Sundblad et al. | 214/6 D X |

FOREIGN PATENTS OR APPLICATIONS

1,395,649    3/1965    France ........................... 214/6 DK

*Primary Examiner*—Robert J. Spar
*Attorney*—Irving M. Weiner

[57] ABSTRACT

A method and apparatus for automatically loading items onto a pallet. The loading means has a pocket to contain the items to maintain their consistent positioning, and guides to accurately deposit the items on the pallet. The loading means may move laterally, transversely, vertically and rotatably enabling a variety of loading configurations. The entire operation may be hydraulic, or pneumatic, and may be controlled by a program, such as by the use of a program tape, or cards, or by a conventional relay control panel.

8 Claims, 10 Drawing Figures

INVENTORS
Thomas Beaty, Jr.
Asib S. Samander

ATTORNEY

FIG.7

AUTOMATIC STACKING APPARATUS

CROSS-REFERENCE TO RELATED APPLICATION

The present application is a continuation-in-part application to co-pending U.S. Pat. application Ser. No. 101,529 filed Dec. 28, 1970 entitled "Automatic Palletizer Method and Apparatus."

BACKGROUND OF THE INVENTION

In the fields of package and material handling, especially in the area of palletizing, the majority of the prior art devices operate in a fashion known as top loading. Top loaders utilize a forming platform level some 10 to 12 feet above the floor level; thus, the items to be loaded, which are often 100 pound bags, must be elevated to this platform level. In addition, walkways and stairways are usually necessary to gain access to the working parts of these machines.

In addition, some of these machines invariably include a vertically movable and/or rotatable pallet platform or turntable to raise the empty pallet from floor level to about 10 to 12 feet above the floor (the platform level) and to rotate and lower the pallet to permit interlocked loading. The mechanism for accomplishing this motion is sometimes located in a pit below the floor level under the pallet and platform.

The problems which develop in gaining access to these machines are apparent from their size alone. Furthermore, if the vertical motion of the pallet and/or the rotation of the pallet are not within predetermined limits of the synchronization with regard to the release of items from the dispensing or loading portion of these machines, the pallets will not be loaded properly and usually the entire load on the pallet will have to be rearranged even though portions may have been loaded properly prior to the loss of the synchronization.

Additionally, many of these machines do not positively locate the item to be loaded in the dispensing or loading portion prior to being loaded onto the pallet, nor are guides used to guide the item in its travel from the dispensing means to the pallet. The result being that the load may not be distributed evenly and uniformly.

SUMMARY OF THE INVENTION

The present invention provides a stacking apparatus for loading articles upon a pallet. The apparatus includes a pocket mechanism for guiding an article to be loaded upon the pallet. The pocket mechanism includes an escapement bottom portion to eject the article contained therein. The apparatus also includes at least one retractable drop guide to guide the article in its movement from the pocket mechanism to the pallet.

The present invention also provides a method of automatically loading articles onto a pallet including the steps of placing a stacking head in a first position to receive an article, and then positioning the article in a pocket interior of the stacking head. The stacking head is then moved to a second position on the pallet. The article is then ejected from the stacking head, and dropped onto the pallet after its ejection from the stacking head. The article is guided in its drop or movement from the stacking head to the pallet.

Accordingly, with the prior art problems in mind, the present invention provides a new and improved method and apparatus for loading a pallet.

It is an object of the present invention to provide a method and apparatus for loading a pallet which permits reasonably easy access to all working parts.

It is a further object of the invention to provide a method and apparatus for stacking or loading a pallet in a staggered or interlocked manner without moving the pallet.

It is yet another object of the present invention to provide a method and apparatus for loading a pallet utilizing hydraulic power exclusively.

It is still another object of the present invention to provide a pallet loading method and an apparatus which are automatically controlled, such as by a program tape or program cards.

These and other objects and advantages are accomplished in a new and improved automatic palletizer method and apparatus. The method includes loading items onto the pallet in interlocking form by vertically, laterally, transversely and rotatably moving the loading apparatus. The apparatus includes means for moving the loading apparatus vertically, means for moving the loading apparatus laterally, means for rotationally moving the loading apparatus, means for positioning the items in the dispensing or loading apparatus, means for releasing items from the loading apparatus, and means for guiding the items in their travel from the loading apparatus to the pallet.

The invention may also include conveyor means for feeding items into the loading apparatus, means for supplying empty pallets to the loading area, and means for removing fully loaded pallets from the loading area.

All the functions described may be performed hydraulically and may be performed automatically, such as under the control of a program tape or similar machine control devices.

BRIEF DESCRIPTION OF THE DRAWINGS

The above mentioned advantages of the present invention, together with other features and advantages which may be attained by its use, will be readily apparent upon reading the detailed description of the invention in conjunction with the drawings. In the drawings, where like numerals identify corresponding parts.

DETAILED DESCRIPTION OF A PREFERRED EMBODIMENT OF THE INVENTION

The principles of the present invention may best be understood by first considering the palletizing operation in general. When stacking items, which may be bags of a granulated or powdered product, or bales, or roofing shingles, or any of a variety of other products, it is generally preferred to stack in a fashion to permit interlocking of the items. In this way an excess of pressure or an uneven pressure will not topple the entire load of items on the pallet.

Figure 1:
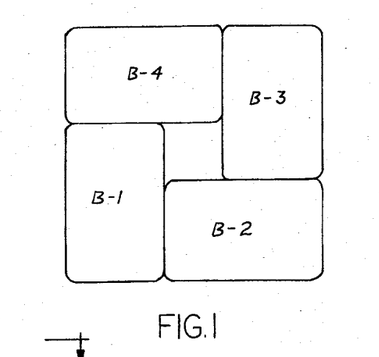
FIGS. 1 and 2 are top views of a partially loaded pallet illustrating alternate layers in an interlocking loading scheme.
Figure 2:
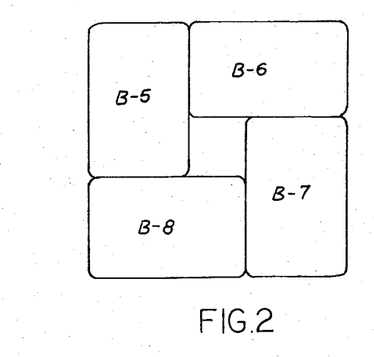

Referring first to FIGS. 1 and 2, the stacking is illustrated as applied, for example, to a four bag pinwheel pattern. It must be realized that this is by way of illustration only; various size pallets may be used and various shapes and numbers of items may be stacked on the pallet. According to the principles of this particular stacking pattern, the first bag B-1 may be placed in the lower left-hand corner of the pallet. Bag B2 is rotated 90° and placed in the lower right-hand corner of the pallet. Bag B-3 is then placed in the upper right-hand corner of the pallet generally parallel to bag B-1. Bag B-4 is rotated 90° and placed in the upper left-hand corner of the pallet generally parallel to bag B-2. The first layer is now completed.

FIG. 2 illustrates the second layer of bags. It is important to remember that the pallet has not been moved; thus, the layer illustrated in FIG. 2 is actually above the layer illustrated in FIG. 1. Bag B-5 is placed in the upper left-hand corner but parallel to bag B-1. Bag B-6 is rotated 90° and placed in the upper right-hand corner, and bag B-8 is rotated 90° and placed in the lower left-hand corner. Thus, the second layer may be thought of as being one-half turn out of phase with the first layer. In this manner the layers "lock" as they are stacked. This is sometimes referred to as "lockstacking the load." If all the layers were the same, for example, if all the layers were similar to FIG. 1, it may be appreciated that there would be four unrelated vertical stacks of bags on the pallet. Any bag loaded improperly on any one stack could cause that entire stack to topple.

Figure 3:
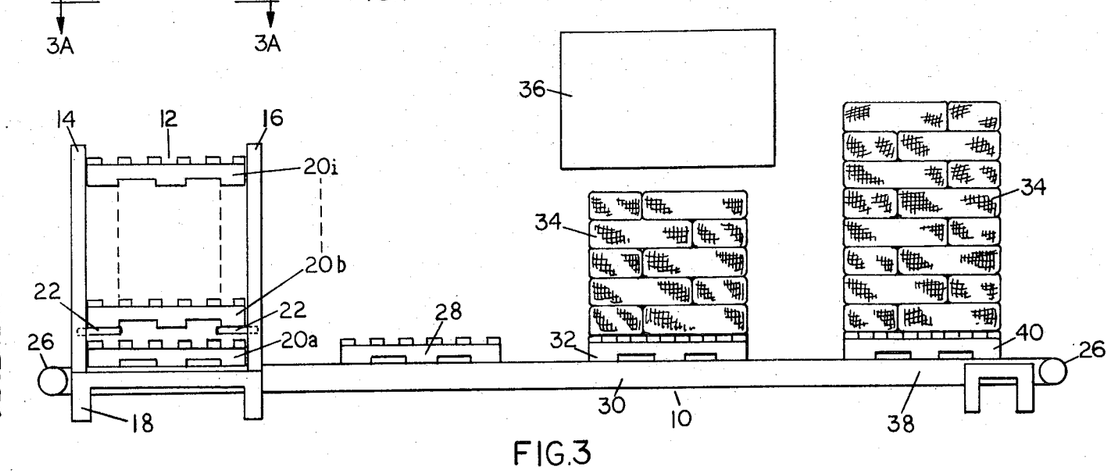
FIG. 3 is a partially diagrammatic front elevational view of an automatic palletizer embodying the principles of the present invention.
Figure 3A:
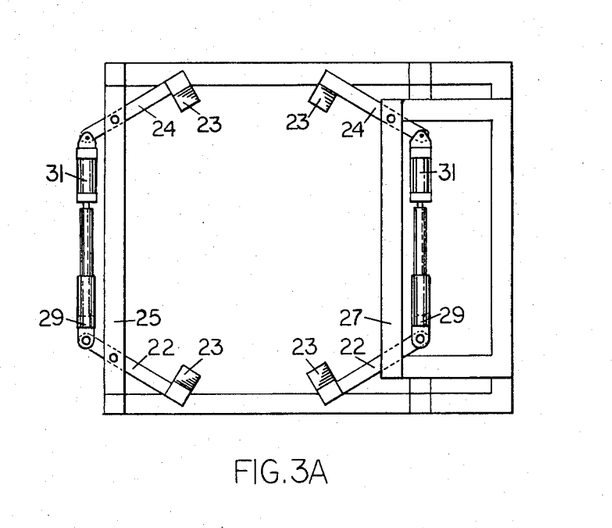
FIG. 3A is a top plan view taken along the line 3A—3A shown in FIG. 3.
Figure 3B:
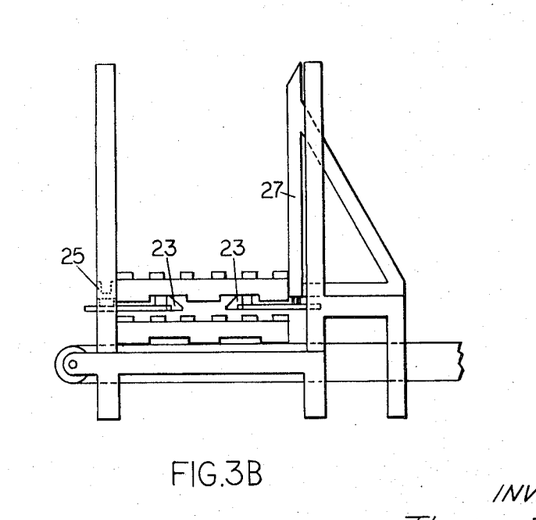
FIG. 3B is a front elevational view of the apparatus shown in FIG. 3A.

Referring next to FIG. 3 the general operation of the automatic palletizer will be explained. FIG. 3 is a diagrammatic front elevation view of the automatic palletizer 10. The palletizer 10 may include an empty pallet magazine 12 which may include vertical support members 14 and 16 and a floor or lower support member 18. Illustrated in FIG. 3 are a plurality of empty pallets 20a ... 20i and two front pivoted lifting arms 22. FIG. 3A also shows two back pivoted lifting arms 24 which are similar to the front pivoted lifting arms 22. A separate lifting wedge 23 is attached to each of the lifting arms 22 and 24. As viewed in FIG. 3A, the two left lifting arms 22 and 24 are pivoted to a horizontal adjustable frame support member 25 (see also FIG. 3B). The two right lifting arms 22 and 24 are pivoted to another horizontal adjustable support frame member 27.

Each lifting arm 22 is associated with and connected to a separate adjustable connector 29. The adjustable connector 29 is pinned to its associated lifting arm 22. Each back lifting arm 24 is associated with and pinned to a separate hydraulic cylinder 31. When the hydraulic cylinders 31 extend, all the pivoted lifting arms 22 and 24 rotate towards the center of the magazine. The lifting wedges 23 will engage the second pallet from the bottom, and lift vertically along the load of the empty pallets. The pallet on the bottom may then be dispensed by a conveyor 26 or by other suitable mechanical means. The hydraulic cylinders 31 are then retracted causing the pivoted lifting arms 22 and 24 to pivot outwardly relative to the center of the magazine in order to release the load of empty pallets. The lifting arms 22 and 24 may then be rotated toward the center of the magazine to engage the second pallet from the bottom when another pallet is needed. FIG. 3 also illustrates a pallet 28 which has been dispensed from the empty pallet magazine 12 just prior to entering the load area 30.

It should be noted that either one or both of the horizontal support members 25 and/or 27 may be adjustable to move toward the right or left as depicted in FIG. 3A in order to adjust the spacing therebetween.

The loading or stacking area 30, as the designation implies, is that area where items such as bags are loaded onto the pallet according to the novel method and apparatus of the present invention. Loading area 30 is illustrated in FIG. 3 with a pallet 32 which has been loaded, for example, with five layers of bags 34. The alternate or interlocking placement of the bags, as explained herein above with reference to FIGS. 1 and 2 may also be seen in FIG. 3. The loading or stacking means 36 is depicted diagrammatically in FIG. 3 above the layers of bags 34 for the purpose of illustrating its relative position in the novel apparatus.

Figure 4:
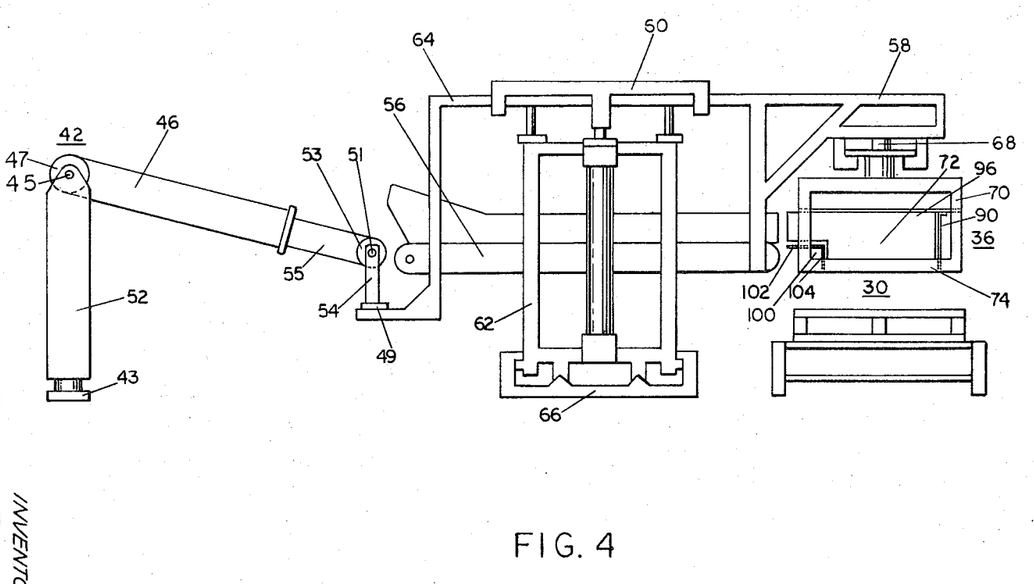
FIG. 4 is a side elevational view of an automatic palletizer embodying the principles of the present invention.
Figure 5:
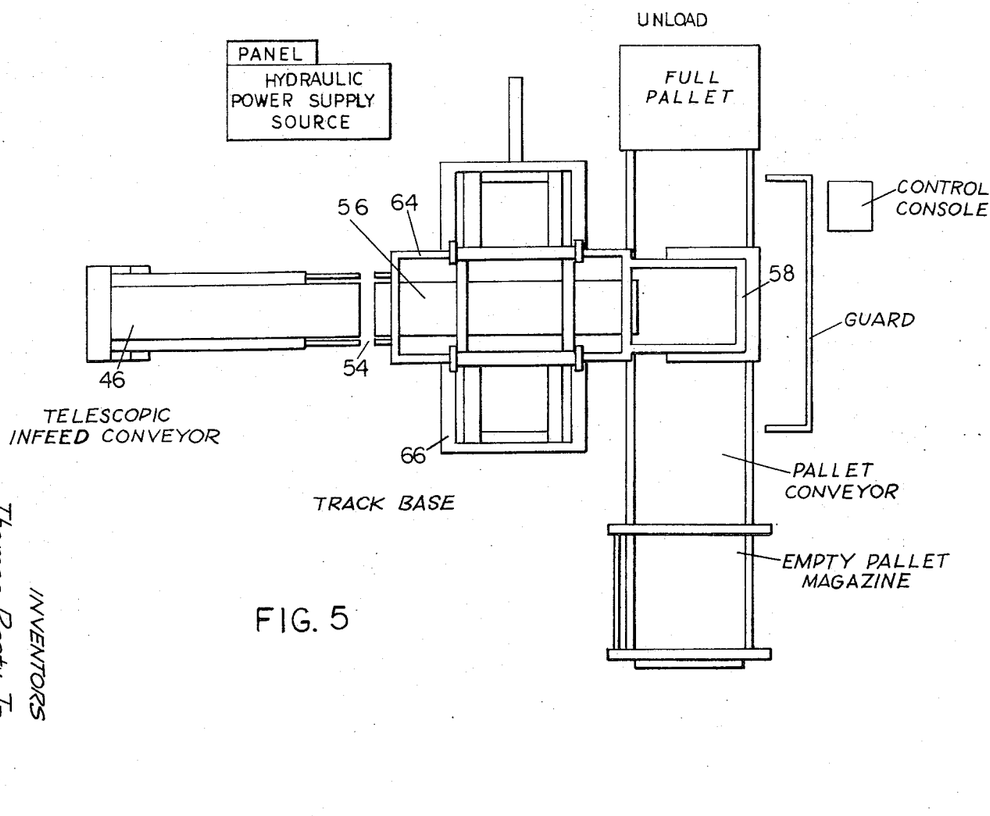
FIG. 5 is a partial plan view of the palletizer of FIG. 4 and includes diagrammatically the empty pallet magazine and loaded pallet removal area.

The details of the stacking means 36 are shown in FIGS. 4 and 5.

On the opposite side of the loading area 30 from the empty pallet dispensing means 12, there may be provided a pallet removal area 38. Conveyor 26 may be extended to carry the fully loaded pallet to the removal area 38, and another conveyor apparatus (not shown) may be used to remove a pallet 40, fully loaded with layers of bags 34, from the removal area 38 to a storage or shipping area.

It should be emphasized at this time that the empty pallet magazine 12 and the pallet removal via the conveyor 26 are not essential to the present invention; as a practical matter empty pallets may be placed into the loading area 30 by hand or by suitable mechanical means, such as a fork-lift truck, and may be removed when fully loaded by a fork lift.

Before explaining the conveying and loading system further, it must be realized that as the various layers are formed in the loading area the stack gets higher. Thus, either the stacking means or loading means 36 may must be elevated or the partially loaded pallet lowered. Since one problem with the prior art palletizers was the need for locating equipment in a pit below the loading area, the solution according to the principles of this invention is to provide loading means 36 which may be moved vertically as needed. In addition, elimination of equipment below the floor level precludes the use of a turntable or rotatable pallet platform. Thus, the loading means 36 should be capable of rotatable, lateral and transversal movement to form the layers of bags 34 as explained with reference to FIGS. 1 and 2.

In most situations the packages or bags 34 that are to be palletized are usually carried by a conveyor from the last step in the manufacturing and packaging process. The conveyor conventionally terminates at a fixed place; thus, the conveyor means of the present invention must be able to deliver a package or bag 34 from a fixed point or area to the stacking or loading means 36 regardless of the position, vertical and/or lateral, of the loading or stacking means 36. The importance of this feature in the present invention can hardly be over emphasized; it would not be economical or feasable to require that the stacking means 36 return to the floor level before each bag 34 is loaded. Therefore, one feature of the present invention is the telescopic infeed conveyor means 46.

Referring to FIGS. 4 and 5, the telescopic infeed conveyor means 46 may increase or decrease in length, swivel to the left or right of center and rotate vertically in an arc while still providing a conveyor path from the fixed point where packages or bags 34 are initially received to the stacking means 36 above the stacking area 30.

The package at the receiving area 42 travels along the telescopic infeed conveyor 46 to the transport conveyor 56. The left or far end support frame 52 of the telescopic infeed conveyor 46 is mounted on a pivot bearing 43 fixed to the floor. The center of this pivot bearing 43 is directly below the center of the extended shaft 45 which supports the tail pulley 47 of the outer section of the telescopic infeed conveyor 46. Shaft 45 serves two functions. It carries the tail pulley 47 of the telescopic infeed conveyor 46 and also serves as a pivot point (via two bearings attached to frame 52) through which the telescopic infeed conveyor 46 can rotate in a vertical plane. A yoke arrangement 54 is connected through a pivot bearing 49 to frame 64 which is a part of first transport frame 58. Yoke 54 is attached to the extended shaft 51 of the head pulley 53 of the telescoping section 55 of the telescopic infeed conveyor 46 through the use of two flange bearings.

The transport conveyor 56 and the stacking means 36 are carried by the transport frame 58. Transport frame 58 may be supported by a hoist frame 60. A hydraulic cylinder (not shown) provides the force to move the transport frame 58 forward or reverse (into or out of the loading area 30 or left or right as illustrated in FIG. 4). A pair of hydraulic cylinders (not shown) are attached to the side transport frame 62 to move the hoist frame 60 vertically.

Thus, it may be appreciated that as hoist frame 60 is moved vertically upwards, frame 64, which is part of transport frame 58, lifts the near end of the conveyor path. The near end of the telescopic infeed conveyor 46, through rotation about extended shafts, or pivot points 45 and 51, and the conveyor's telescoping or extending capability, will follow the movement of the transport frame 58. Thus packages 34 from the receiving point 42 will be delivered to the appropriate elevation. Similarly, because of the swivel points, or pivot bearings 43 and 49, and the telescoping or extending capability of the telescopic infeed conveyor 46, lateral movement of transport frame 58 (see FIG. 5) will not break the conveyor path from the receiving area 42 to the transport conveyor 56.

At this point it is appropriate to indicate that hydraulic cylinders and hydraulic piping have been omitted for clarity. It is quite well known that hydraulic apparatus may be used in a conventional manner to provide the several types of motion described.

Referring to FIG. 5, the partial plan view of the apparatus just described illustrates the track base 66 which permits lateral or side-to-side movement of the transport frame 58. Again, because of the structural support from frame 58 via frame 64 and swivel point 49 and pivot point 51, conveyor 46 pivots about its near and far ends at frame 52 and yoke 54, and the yoke 54 follows the transport frame 58. Thus, it may now be seen and appreciated that the conveyor system follows vertical, lateral, and/or front and rear motion of the transport frame 58 to provide a conveyor path from the fixed area 42 to the loading means 36. With reference to FIG. 4, the loading or stacking means 36 includes a swivel or pivot 68 suspended from transport frame 58, and a stacking head 70 mounted to the bottom portion of the swivel 68. The purpose of this swivel connection 68 is to permit the stacking head 70 to be hydraulically rotated 90° about a vertical axis. Rotation of the stacking head 70 in an arc of 90° clockwise or counter-clockwise to the longitudinal axis of the palletizer is an important feature of the invention. It is also within the ambit of the present invention to provide for a 180°, 270°, and/or 360° rotation of the stacking head 70, if desired.

Considering FIGS. 1, 2 and 4 together, it will now be appreciated that front and rear motion of transport frame 58 within the hoist 60 permits packages to be stacked at the front and rear of a pallet; lateral movement along track base 66 permits packages to be stacked at the left and right sides of the pallet; the rotational movement of stacking head 70 which is swivel connected 68 to the transport frame 58 permits rotation of packages, and, of course, vertical movement of the hoist 60 within the side transport frame 62 permits stacking at each successive height or level on the pallet.

Referring to FIGS. 4, 6, 7 and 8, the stacking head 70 includes a five-sided interior pocket generally denoted as 72 which captively holds the package or bag 34, thus consistently locating successive bags 34 above the pallet at the stacking area 30. Pocket 72 is formed by an escapement bottom generally denoted as 74 having two escapement panels 78 and 80, an adjustable front stop 90, a portion of which extends downwardly between the escapement panels 78 and 80, two adjustable side guides 96 and 98, and a non-adjustable back guide generally denoted as 100. The non-adjustable back guide 100 is made up of a substantially horizontal component 102, which may contain rollers to facilitate movement of bag 34 into the pocket 72, and a substantially vertical component 104 which extends downwardly between escapement panels 78 and 80 forming the rearmost wall of the pocket 72.

The front stop 90 and side guides 96 and 98 can be made adjustable by various means well known in the art. For example, front stop 90 may have a flange 114 (see FIG. 7) which is affixed to a supporting member 116 (see FIG. 6) with removable fasteners such as bolts. The supporting member 116 could have a series of holes, a long slot, or a Unistrut type channel to accept the removable fastener. To reposition or adjust the front panel, the bolts would be moved from one set of holes in support member 116 to another set of holes in member 116 corresponding to the new desired position for the front stop 90. The side guides 96 and 98 could similarly have flanges 118 and 120 respectively (see FIG. 6) affixed to supporting members 122 (see FIG. 7) and be adjustable in a like manner to that described above in regard to the front stop 90. It must be realized that the above-described manner of adjustably mounting front panel 90 and side guides 96 and 98 is by way of illustration only, and should not restrict or limit the invention as a variety of adjustable mountings will occur to those skilled in the art.

Referring briefly to FIG. 4, it is recalled that packages or bags 34 to be stacked are delivered along conveyor paths 46 and 56. The package 34 leaves conveyor 56 and its trajectory causes it to move onto the horizontal component 102 of the non-adjustable back guard 100, and subsequently to drop into, and be contained by pocket 72. Thus, the bag 34 is captively held and located in proper preloading position in the stacking head 70 above a pallet at loading area 30.

Figure 6:
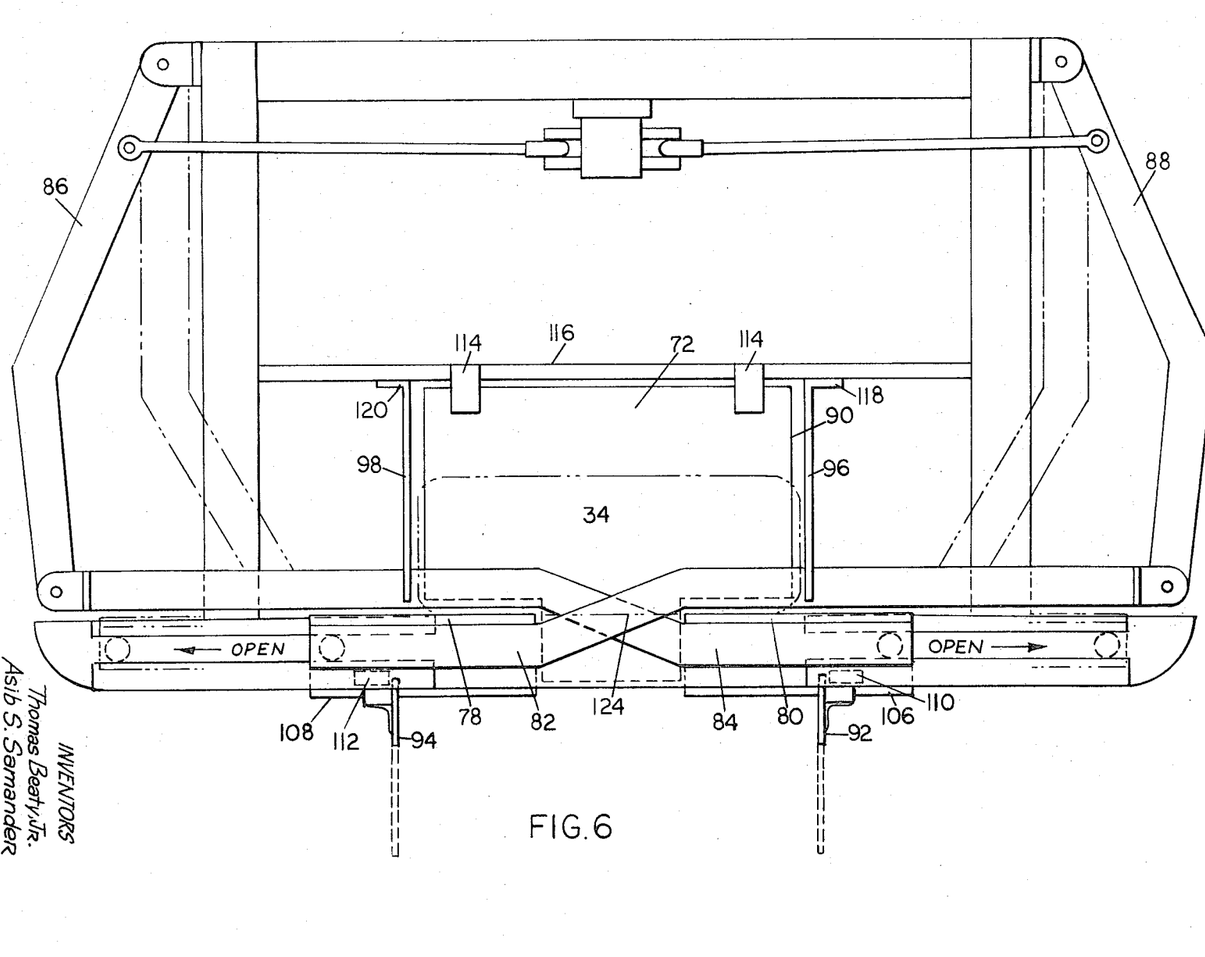
FIG. 6 is a front view of a preferred embodiment of the stacking or loading head of the present invention.

Referring next to FIG. 6, the stacking head with escapement bottom 74 will now be described. In FIG. 6 the solid lines indicate the escapement in a closed position, and the dotted lines indicate the escapement in an open position. With the escapement in the closed position, a space generally denoted as 124 is retained between the escapement panels 78 and 80. A portion of the adjustable front stop 90 and back guide vertical component 104 extends into this space 124. A package or bag 34 will rest on escapement panels 78 and 80, which are part of horizontal escapement members 82 and 84 respectively. When the substantially vertical members 86 and 88 are brought together, the horizontal escapement members 82 and 84, and the escapement panels 78 and 80 move horizontally apart to the open position. This provides an opening through which the package or bag 34 may drop onto the pallet. During its fall, bag 34 is guided by the portions of the front stop 90 and back guide vertical component 104 which extend downwardly between the escapement panels, and by the retractable drop guides 92 and 94.

Figure 7:
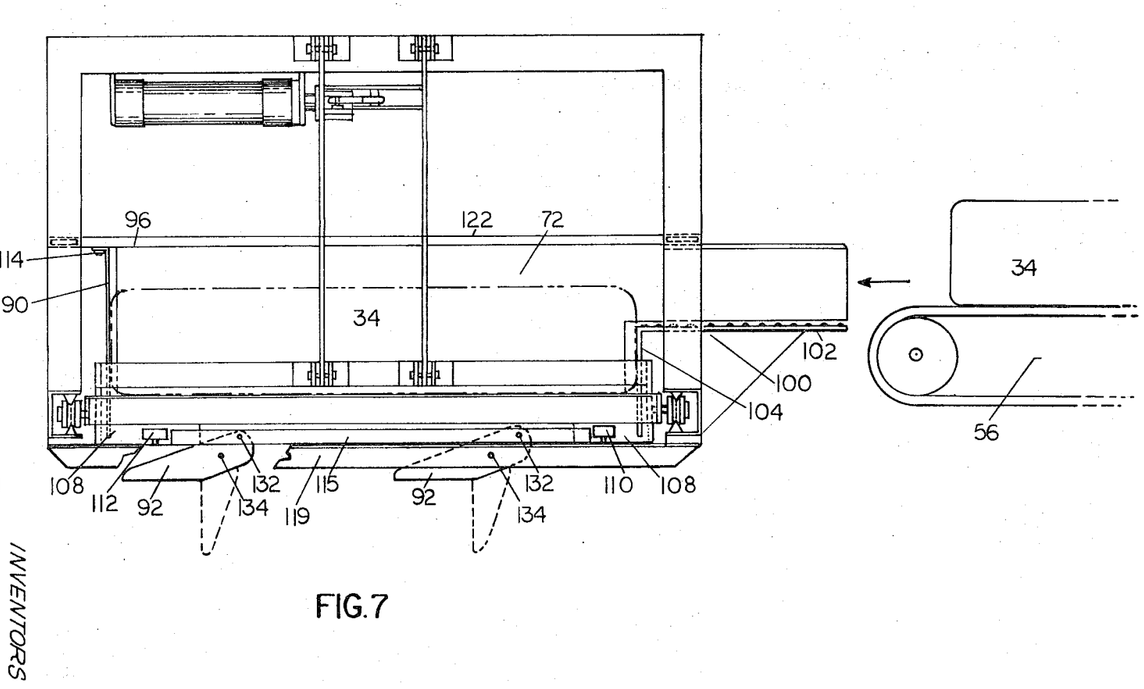
FIG. 7 is a side view of a preferred embodiment of the stacking or loading head of the present invention.
Figure 8:
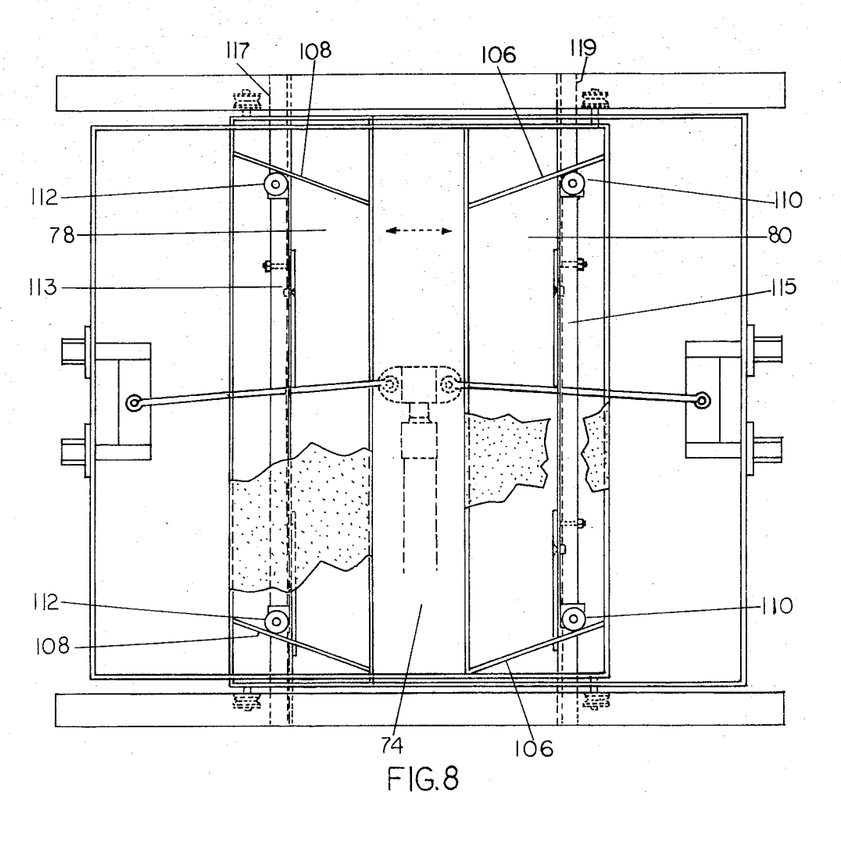
FIG. 8 is a top view of a preferred embodiment of the stacking or loading head of the present invention.

Referring now to FIGS. 6, 7 and 8, the operation of the left retractable drop guides 92 and right retractable drop guides 94 will be described. When the escapement bottom 74 is in the closed position, the retractable drop guides 92 and 94 are in their retracted position, shown by solid lines. When the escapement bottom 74 is in the open position, the retractable drop guides 92 and 94 are in their extended position, shown by dotted lines. Cam surfaces 108 and 106 are associated with the bottom surfaces of escapement panels 78 and 80 respectively. Cam followers 112 and 110 are affixed to connecting bars 113 and 115, respectively, and are in contact with their respective cam surfaces. Connecting bars 113 and 115 are each capable of longitudinal movement. The retractable drop guides 92 and 94 are pivotally and slidably mounted near one end thereof to connecting bars 113 and 115 through pivot points 132, and pivotally connected near the center thereof to support members 117 and 119 through pivot points 134 (FIG. 7). The support members 117 and 119 are stationary.

When escapement panels 78 and 80 move to the open position cam surfaces 106 and 108 act on cam followers 110 and 112 exerting a force which pushes the connecting bars 113 and 115 transversely to the direction of movement of the escapement panels 78 and 80, or to the left as viewed in FIG. 7. This movement of the connecting bars 113 and 115 causes pivot points 132 to move in a direction generally toward pivot points 134, or to the left as viewed in FIG. 7. Because the location of pivot points 134 are fixed, this motion of the pivot points 132, causes the retractable drop guides 92 and 94 to rotate about pivot points 134 to their extended position, indicated by dotted lines in FIGS. 6 and 7.

When escapement panels 78 and 80 move to the closed position, cam surfaces 106 and 108 act on cam followers 110 and 112 exerting a force which pushes the connecting bars 113 and 115 transversally to the direction of movement of the escapement panels 78 and 80 and in a direction opposite that taken when the escapement panels opened, or to the right as viewed in FIG. 7. This movement of the connecting bars 113 and 115 cause pivot points 132 to move in a direction generally away from pivot points 134, or to the right as viewed in FIG. 7. Again, because the location of pivot points 134 are fixed, this motion causes the retractable drop guides 92 and 94 to rotate about pivot points 134 to their retracted position, indicated by the solid lines in FIGS. 6 and 7.

It can be seen from the above description that when the escapement panels 78 and 80 are in the closed position the retractable drop guides 92 and 94 are in the retracted position, and when escapement panels 78 and 80 are in the open position, the retractable drop guides 92 and 94 are in the extended position. When in the extended position the drop guides serve to guide the bags 34 in their drop to the pallet, and in the retracted position afford clearance so as to eliminate any possibility of interference with previously deposited packages and to allow loaded pallet removal from stacking area 30.

The entire palletizer 10 may be electrically controlled to prevent any movement until the escapement panels 78 and 80 are in the closed position, and retractable drop guides 92 and 94 are in the retracted position. Methods and circuitry to electrically control the palletizer to accomplish this are well known and will, therefore, not be described in detail.

This completes the description of the various features of the palletizer according to the principles of the present invention. In light of the present-day technology it must be appreciated that it is desirable to fully automate this procedure. Many processes are computer-controlled or controlled by a program tape or program cards. Basically, a punched tape or punched cards may be used along with a device to feed the cards or tape and sense the position of the various holes. The particular location of the punched holes may be electrically sensed to open or shut relays and thereby cause particular motors to be started or stopped, or particular pumps to be started or stopped. The distance between various groups of holes indicate the time intervals during which the particular operation continues. Since tape controlled machines are quite well-known, it is believed that the above basic description of the principles of such a system will suffice to permit one with ordinary skill in the technology of tape controlled machinery to automate the palletizer of the present invention. Such automation will not be illustrated or explained in detail since each aspect of motion and each step in the process has already been set forth as part of the explanation of the present invention.

We claim:

1. A stacking apparatus for loading articles upon a pallet, said apparatus comprising:
   a frame;
   a stacking head rotatably carried by said frame and having a pocket for receiving and holding an article to be loaded upon said pallet, said stacking head having an escapement bottom portion for ejecting said article contained in said pocket;
   means for moving said frame along a first axis for selectively loading portions of said pallet;
   means for moving said frame along a second axis perpendicular to said first axis for selectively loading portions of said pallet;
   means for rotating said stacking head for stacking, in conjunction with each of said moving means, first layer of said articles on said pallet;
   means for vertically raising said frame and said stacking head for stacking successive layers on said pallet while said pallet remains stationary; and
   guide members carried on the bottom side of said stacking head adjacent to escapement bottom portion of said stacking head, said guide members being movable between a first position wherein said guide members extend downwardly from said bottom portion in response to said escapement bottom portion ejecting said article contained in said pocket such that said guide members guide said ejected article as the same is positioned on said pallet, to a second retracted position in response to the closing of said escapement bottom portion.

2. The stacking apparatus defined in claim 1 wherein said stacking head has an adjustable front stop and two side guides, one of which is adjustable to permit the size of said pocket to be selectively changed to accommodate articles of different sizes.

3. The stacking apparatus defined in claim 2 further comprising a non-adjustable back guide.

4. The stacking apparatus defined in claim 1 wherein said stacking head comprises a five-sided pocket, the bottom side thereof forming a portion of said escapement bottom portion, said five-sided pocket of said stacking head containing said article to be loaded therein to precisely locate successive articles in said stacking head; and guide members retractably mounted adjacent the bottom portion of said stacking head for guiding articles dropped from said stacking head by means of said escapement bottom portion.

5. The stacking apparatus defined in claim 1 wherein said stacking head further comprises front stop, two side guides and a non-adjustable back guide.

6. The stacking apparatus defined in claim 5 wherein said front stop is adjustable and both of said side guides are adjustable to permit the selective changing of the size of said pocket to accommodate articles of varying sizes.

7. A stacking apparatus for loading articles upon a pallet, said apparatus comprising:
   a stacking head having a pocket portion for receiving and holding an article to be loaded upon said pallet, said stacking head having an escapement bottom portion comprising a pair of horizontally, oppositely displaceable support members, said members being movable between a first position wherein the upper surfaces thereof receive and support said article contained in said pocket, to a second retracted non-supporting position wherein said members are horizontally displaced in opposite directions for dropping said article contained in said pocket so the article will be stacked on a pallet therebelow; and guide member means carried on the bottom of said stacking head, said guide members being movable to a first position in response to the retracting movement of said support members wherein said guide members extend downwardly to guide said ejected article as it is dropped and to a second retracted position in response to the movement of said support members to their first position.

8. A stacking apparatus for loading articles upon a pallet, said apparatus comprising:
   a stacking head having a pocket portion for receiving and holding an article to be loaded upon said pallet, said stacking head having an escapement bottom portion comprising a pair of horizontally, oppositely displaceable support members, said members being movable between a first position wherein the upper surfaces thereof receive and support said article contained in said pocket, to a second retracted non-supporting position wherein said members are horizontally displaced in opposite directions for dropping said article contained in said pocket;
   A first linkage means having a portion thereof carried by said stacking head on the side thereof associated with one of said support members and operatively coupled to the other of said support members; and
   a second linkage means having a portion thereof carried by said stacking head in opposing relation to said first linkage means on the side of said stacking head associated with said other support member, said second linkage means being operatively coupled to said one support member; said first and second linkage means, upon actuation, being movable toward each other for moving said support members to said second retracted non-supporting position and being movable in opposite directions for moving said support members to said first position.

* * * * *